Dec. 29, 1970   T. H. FAIRBANKS   3,550,202
APPARATUS FOR EXTRUDING WOVEN NET-LIKE STRUCTURES
Original Filed Oct. 24, 1967   3 Sheets-Sheet 1

United States Patent Office 3,550,202
Patented Dec. 29, 1970

3,550,202
APPARATUS FOR EXTRUDING WOVEN
NET-LIKE STRUCTURES
Theodore H. Fairbanks, Liverpool, Pa., assignor to FMC
Corporation, Philadelphia, Pa., a corporation of Delaware
Original application Oct. 24, 1967, Ser. No. 677,603.
Divided and this application Nov. 10, 1969, Ser.
No. 875,128
Int. Cl. B29f 3/04
U.S. Cl. 18—12                                          18 Claims

ABSTRACT OF THE DISCLOSURE

Apparatus for making woven webs or net-like structures by extrusion.

---

This application is a division of application Ser. No. 677,603, filed Oct. 24, 1967.

The invention relates to apparatus for making woven webs or net-like structures by extrusion.

U.S. Pat. No. 2,919,467, is typical of a large number of prior disclosures relating to the manufacture of net-like structures by extrusion in which an integral junction is formed at every intersection of mesh strands.

In accordance with the invention disclosed in my U.S. patent application 656,501, entitled "Manufacture of Net-Like Structures" it is now possible to make a net-like structure which has the appearance of a woven fabric. In such structure at least some of the individual mesh strands are bonded to certain intersecting strands at their points of crossing to form integral, unitary strand junctions, and are unconnected to other of such intersecting strands at their points of crossing. Completely lacking in prior disclosures are teachings or suggestions for making a woven net-like web or fabric by direct extrusion. Accordingly, a primary object of this invention is to provide a new or generally improved and more satisfactory apparatus for making woven webs or net-like structures.

Another object of this invention is an apparatus for making woven webs or net-like structures by extrusion.

Still another object is the provision of an apparatus for extruding braids or webs having interlaced strands.

A further object is the provision of an apparatus for extruding woven webs having non-ravelling edges.

A still further object is the provision of an apparatus which is adapted for continuous, and economical manufacture of woven webs by extrusion.

These and other objects are accomplished in accordance with the present invention by an apparatus for practicing a method in which a series of streams of plastic or flowable strand-forming material are extruded in each of two spaced, generally parallel surfaces. The term "surfaces" is employed throughout the description and claims in its geometrical sense as a two-dimensional locus of points and thus includes both planes and curved (e.g. cylindrical) surfaces. These streams are moved within the respective surfaces, transversely of the direction of extrusion, and with the movement of the series of streams within one surface being in a direction opposite to that of the series of streams within the other of such surfaces. Thus, the series of extruded streams in one surface periodically cross with the series of streams in the other of such surfaces. These crossing streams, however, do not contact with each other since the surfaces in which they lie are spaced from each other. At locations which alternate with the locations at which the streams cross, the respective series of streams are caused to simultaneously reverse or exchange planes along which they are extruded, without interruption in the extrusion of such streams, to effect interlacing of the two series of streams. The extruded streams of strand-forming material, in their crossing and interlaced relationship are then set, to provide a woven web or net-like structure.

The movement of each series of streams within their respective surfaces is preferably continuous, with the streams of each series moving in unison. This movement of the streams transversely of the direction of extrusion and the periodic reversal of the surfaces along which the respective series of streams are extruded is preferably effected at the points at which such streams are extruded.

Setting of the extruded streams of flowable strand-forming material is achieved in a conventional manner, as by cooling, solvent removal, or chemical conversion, depending upon the particular character of the strand-forming material which is being employed.

More particularly, the apparatus of the present invention includes a pair of movable members, having like sets of extrusion openings therein, which are supported along opposite sides of and in sliding contact with a fixed separator plate having a series of spaced partitions. Means are provided for feeding plastic or flowable strand-forming material to the openings in the movable members from which it is extruded in each of a pair of spaced parallel surfaces as a series of streams, and for moving the members so as to displace the openings in one of such members in a direction opposite to the displacement of the openings in the other of such members and transversely of the direction of extrusion. The apparatus further includes means for periodically causing the series of streams to simultaneously reverse surfaces along which they are extruded so as to provide for interlacing of such strands.

The separator plate is positioned between the movable members with the free ends of the spaced partitions thereof terminating adjacent to the exit portions of the openings in the movable members, and preferably extending slightly beyond the exit portions of such openings. The space between the movable members which is occupied by the partitions is closed by a portion of the separator plate which extends along and adjacent to entrance portions of the openings in such movable members so that the only material which is extruded is that which is delivered to the openings in the movable members. The partitions of the separator plate are only of such thickness as to satisfy strength requirements.

More specifically, in one illustrated embodiment of the invention the apparatus includes a pair of elongated, parallel rollers which are supported along opposite sides of and in sliding contact with the fixed separator plate. The rollers are of like construction, with each having peripheral grooves located at spaced intervals along intersecting helices of the same pitch. All of the grooves are of the same length and each is equal in length to the ungrooved portion of the roller surface extending between the ends of adjacent grooves of the same hand. More specifically, the ends of each groove and the ends of adjacent grooves along either helix are spaced the same distance, as measured along the length of the roller. While these grooves extend along intersecting helices, the grooves of one hand are located so as to pass midway between the ends of adjacent grooves of the opposite hand. All of the roller grooves are also of like width and are at least as wide at the roller periphery as they are at their base to insure easy removal of plastic material therefrom.

The separator plate is of a construction as heretofore mentioned, with the spaces or slots between partitions having a center-to-center spacing equal to the length of each roller groove, as measured along the length of the roller. The width of each of these slots of the separator plate is substantially equal to the width of the roller grooves and thus the partitions are each of a width equal to the length of a roller groove, as measured along the length of a roller, less the width of a separator plate slot.

As heretofore mentioned, the separator plate is fixed and thus remains stationary. The rollers, however, are both turned so that the grooves therein cooperate with the stationary separator plate to define extrusion orifices. Plastic material which is to be extruded is delivered under pressure to the side of the rollers opposite the free ends of the partitions of the separator plate and thus flows through the extrusion orifices, as defined by the separator plate and the grooves in the rotating rollers, and toward the free ends of the separator plate partitions.

Since each of the roller grooves extends along a helix, the extrusion orifices defined by such grooves and the streams of plastic material issuing therefrom will travel transversely of the direction of extrusion as the rollers are turned, either in the same or opposite directions. Thus, if the rollers are both to be turned in the same direction, the grooves of the two rollers which, at any moment define extrusion orifices, extend along helices of opposite hand so that the streams issuing therefrom travel in opposite directions transversely of the direction of extrusion. On the other hand, if the rollers are to be rotated in opposite directions, the extrusion orifices are defined, at any particular moment, by grooves extending along corresponding helices of the same hand on the two rollers, so that the transverse travel of the streams extruded from orifices defined by the grooves of one of the rollers will be opposite to that of the streams extruded from orifices defined by the grooves of the other of such rollers.

Regardless of the direction of roller rotation, it is essential for satisfactory practice of the method with this embodiment that extrusion of plastic material through the orifices commence when the leading ends of the grooves defining such orifices are aligned with spaces between separator plate partitions and terminate when the opposite or trailing ends of such grooves move into alignment with spaces between partitions immediately adjacent those at which extrusion was started.

In the operation of the specific embodiments of the invention described above, streams of plastic material as described above, will be extruded through orifices defined by grooves extending along helices of unlike or like hand, depending upon the direction of roller rotation. The helical grooves will cause the extruded streams to move transversely of the direction of extrusion, with the transverse movement of the series of streams extruded from grooves of one roller being in a direction opposite to the series of streams issuing from grooves of the other of such rollers. The streams of one of the series of streams will alternate with the streams of the other thereof and, as such series of streams undergo their opposite movement transversely of the direction of extrusion, adjacent streams will pass each other or cross about midway of adjacent separator plate partitions. The partitions, however, will maintain such streams separated from each other at these locations so that bonding of the crossing streams will be prevented.

With continued roller rotation, the roller grooves through which plastic material is extruded approach and then move into alignment with slots in the separator plate. Full communication with slots in the separator plate is achieved at the trailing ends of such grooves. Simultaneously with the movement of the trailing ends of these grooves into alignment with slots in the separator plate, the leading ends of grooves in an opposing roller also move into alignment and communication with the separator plate slots. Thus, as extrusion of plastic material from certain roller grooves stops, extrusion concomitantly starts through grooves of an opposing roller which are aligned therewith and, since such aligned grooves communicate with each other through the separator plate slots, continuity of the extruded streams is maintained.

The result of extruding a separate series of streams of plastic material through grooves of each of the rollers and the continuation of extrusion of the streams of the respective series through grooves of an opposing roller, as described above, is that the respective series reverse or exchange surfaces or planes along which the streams thereof are extruded. As will be more apparent hereafter, this movement of streams from one plane to another provides for interlacing of the streams which, when set, result in a desired pattern of woven strands.

Of significance in this reversal or exchange of planes along which the series of streams are extruded is that the roller grooves through which extrusion of plastic material is terminating and the roller grooves of an opposing roller through which extrusion is simultaneously starting are of opposite hand if the rollers are rotating in the opposite directions or of the same hand if the rollers are rotating in the same direction. That is, the roller rotation containing the latter grooves will be such that the individual strands will at all times continue to move in the same direction during their travel transversely of the direction of extrusion.

In the embodiment of the invention thus far described, it is preferred that the roller grooves which extend along intersection helices terminate, adjacent to the ends of the rollers, in grooves which extend annularly about the roller peripheries. These annular grooves are at all times in alignment with slots in the separator plate so that straight streams of plastic material are continuously extruded therefrom. Since certain of the roller grooves which extend along intersecting helices terminate or connect with these annular grooves, it will be apparent that the straight, continuous streams of plastic material extruded from the latter grooves will serve, when set, as selvage strand which maintain the interlaced relationship of the other strands of the resulting structure or web and thus prevent the same from unravelling.

In addition to or as an alternative to annular roller grooves as described above, the opposite end portions of both rollers may be provided with grooves along all of the intersecting helices. Streams extruded through the roller grooves on opposite sides of the separator plate partitions would contact each other at the separator plate slots to form integral junctions which would firmly hold the woven strands in the relative positions and provide for a somewhat elastic selvage along the resulting web.

It will, of course, be apparent that some variation can be made in structure and operation of the above-described apparatus without departing from the spirit and scope of the invention. For example, the number or pitch of the grooves along each helix may be changed, providing each helix has the same number of like grooves. Further, the rollers may be of different diameters and thus be driven at different speeds as long as the grooves in all rollers extend along helices of like pitch. Additionally, plastic material of different color and/or composition may be extruded through the grooves of the two rollers so that the color and/or composition of the interlaced strands differs at intervals along their lengths.

In another embodiment of the present invention, the apparatus includes a pair of opposing elongated movable members having sets of cooperating, complementary extrusion openings or grooves formed along opposing surfaces thereof and to which flowable, plastic material is delivered. A fixed separator plate, having a construction as heretofore described, is positioned between the movable members, with the opposing surfaces of such members being in snug but sliding contact with the separator plate partitions. Means are provided for relatively displacing these members, such as by oscillating or reciprocating the same longitudinally in opposite directions.

A shutter is mounted on each side of the separator plate, adjacent to the free ends of the partitions thereof, for reciprocating movement. Both shutters are shifted in opposite directions through one-half of their stroke intermittently and independently of and relative to the movable members, to cause the series of streams of plastic material extruded through openings in the respective movable members to reverse or exchange planes along which they are extruded.

The elongated movable members are of like construction, with the extrusion openings or grooves formed along the opposing surfaces thereof being of substantially the same width and depth and spaced equal distances along the length of such members. In the separator plate, the width and spacing of the slots or spaces between adjacent partitions corresponds to that of the openings in the movable members and thus the partitions themselves are each equal to the center-to-center spacing of the extrusion openings less the width of one of such openings.

The shutters are preferably in the form of flat plates having spaced recesses along the opposing edges thereof. The shutter recesses and the unrecessed portion therebetween are all of the same length, which is equal to the center-to-center distance between adjacent extrusion openings. The depth of these recesses must be at least equal to depth of the openings or grooves in the movable members. As heretofore mentioned the shutters are mounted for simultaneous reciprocating movement in opposite directions and relative to the movable members.

During extrusion of the streams, the movable members are continuously reciprocated at the same speed, with each travelling a distance equal to the center-to-center spacing of the extrusion openings during one-half of its stroke. The shutters are positioned with the recesses thereof being in aligned relationship and are shifted only at the instant that the movable members complete travel in their respective directions and are to reverse their directions of movement. During each shift of the shutters they move in opposite directions, a distance equal to only one-half of their reciprocating stroke, which is equal to that of the movable members.

With the movable members in motion as described above and with plastic material supplied thereto, streams of plastic material are extruded from those openings of each movable member which travel along recesses in the shutters. The remaining openings in the movable members will be covered at their exit ends by unrecessed portions of the shutters so that no plastic material issues therefrom. The streams extruded through openings in the respective movable members will all lie in the same surface or plane and the series of streams of one series will alternate with the streams of the other of such series.

The linear motion of the movable members will cause the extruded streams to travel transversely of the direction of extrusion and, since these members are moved in opposite directions, the streams of one series will cross the streams of the other series as opposing extrusion openings are about midway across separator plate partitions. At such locations openings in the opposing movable members are in aligned relationship but do not communicate with each other in view of the interposed separator plate partitions and thus no contact of the crossing streams occurs.

Upon continued travel of the movable members, the openings thereof through which plastic material is being extruded approach and then move into alignment with slots in the separator plate. These particular extrusion openings also approach unrecessed portions of the stationary shutters and are each about one-half covered by such portions of the shutter when they are in full communication with the slots in the separator plate.

As openings in the movable members through which plastic material is being extruded move into alignment with separator plate slots, openings in an opposing movable member, which have heretofore been covered by the unrecessed portions of shutters, also move into alignment and communication with the separator plate slots. Moreover, these latter openings, when in complete communication with the separator plate slots, move partially beyond the unrecessed portions of the shutters and are each about one-half covered by such shutter portions. Thus, as the unrecessed portions of the shutters partially close off extrusion through certain extrusion openings in the movable members, partial extrusion is concomitantly started through openings which are aligned and in communication therewith.

In the position of the elements of the apparatus described above, the movable members are ready to reverse their directions of travel and it is at this instant that the shutters are simultaneously shifted in opposite directions to now locate unrecessed portions thereof over openings in the movable member which had just previously travelled along shutter recesses and to completely open extrusion openings which are in alignment therewith. Concomitantly with this shifting of the shutters, the movable members reverse their directions of travel. Extrusion of plastic material is continuous and upon shifting of the shutter as described above, openings in the movable members which had previously been covered by the unrecessed shutter portions now travel along recesses in the shutter so that continuous streams issue therefrom. On the other hand, openings in the movable members through which extrusion did occur prior to the reversal of travel of such member, now move relative to unrecessed shutter portions and are thus covered at their exit ends.

The result of extruding a separate series of streams of plastic material through openings or grooves in each movable member and the continuation of extrusion of the streams of the respective series through grooves of an opposing movable member, as described above, is that the respective series reverse or exchange planes along which the streams thereof are extruded. As will be more apparent hereafter, this movement of streams from one plane to another provides for interlacing of the streams which, when they are set, result in a desired pattern of woven strands.

Of significance in this reversal or exchange of planes along which the series of streams are extruded is that the openings in a movable member through which extrusion of the plastic material is terminating and openings in an opposing movable member through which extrusion is simultaneously starting are moving in opposite directions transversely of the direction of extrusion. As a result, the individual strands will at all times; that is, both before and after movement into and out from the different planes of extrusion, continue to move in the same direction during their travel transversely of the direction of extrusion.

After the shift of the shutters, the movable members continue their movement in reverse directions until opposing openings in such members again cross and are in alignment with separator plate slots. In this latter position the planes along which the streams are extruded are again reversed as described above.

In this embodiment of the invention, the rate of extrusion and/or reciprocation of the displaceable members may be varied, providing the movement of the shutters is also changed accordingly, and plastic material of different color and/or composition may be extruded through the openings of the separate displaceable members.

Throughout the disclosure, the terms "align" and "alignment" mean the juxtaposition of extrusion openings of the respective sets in their displacement so as to coincide or come exactly opposite to one another or into partially overlapping positions. The term "communication," also as employed with the sets of extrusion openings, means that aligned openings are open to each other at a slot in the separator plate so that they together form a single composite opening.

While the following detailed description of the second embodiment of the invention makes reference to elongated or flat movable members, the teachings of this invention are equally applicable to annular movable members and correspondingly shaped shutters which can be relatively displaced with oscillating movements.

The teachings of the present invention are applicable for use with a variety of materials, which are referred to by the term "plastic," including materials which are thermoplastic, such as polyamides, polyesters, polyvinyl chloride, copolymers thereof, polyolefins, cellulose acetates, metals, glasses, etc., natural or synthetic rubbers, thermosetting materials or wet-spinnable materials, such as viscose, cupro-ammonium cellulose, or carboxymethyl cellulose. Such materials may include various additives such as stabilizers, dyes, foaming agents, etc., if so desired. It will be apparent that the manner by which the extruded junction and mesh-strand forming streams are set will depend upon the particular material which is being employed.

For a greater understanding of this invention, reference is made to the following detailed description and drawing in which FIG. 1 is a vertical section taken transversely of one embodiment of the apparatus of the present invention;

Figure 1:
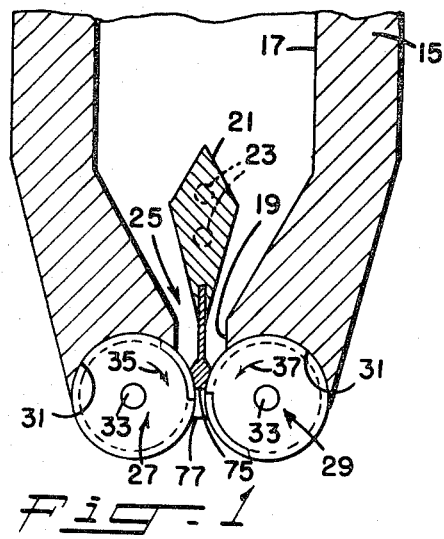

With reference to the drawing, the apparatus shown in FIG. 1 is designed for making a woven net-like structure or fabric from thermoplastic material and includes an elongated extrusion block 15 having a chamber 17, into which molten thermoplastic material is delivered as by a conventional screw extruder, not shown, the block 15 has suitable end plates and a discharge slot 19. Positioned within and extending the length of the chamber 17 is a rigid bar 21 which is fixed in place by pins 23. A separator plate 25 is supported and extends from the bar 21 and projects through the slot 19 and in between a pair of rollers 27 and 29. The lower end of the extrusion block 15 is suitably shaped with curved walls 31 for receiving the rollers 27 and 29 which, together with the separator plate 25 close the discharge slot 19.

The rollers 27 and 29 engage snugly with the opposite sides of the separator plate 25 and are each provided with spindles 33 which project from opposite ends thereof. The roller spindles 33 are supported by suitable means, not shown, so as to permit the rollers 27 and 29 to turn. As heretofore mentioned, the rollers 27 and 29 may be rotated in the same or opposite directions and, for the sake of simplicity are hereafter described as being rotatable in opposite directions, as indicated by arrows 35 and 37, respectively.

Figure 2:
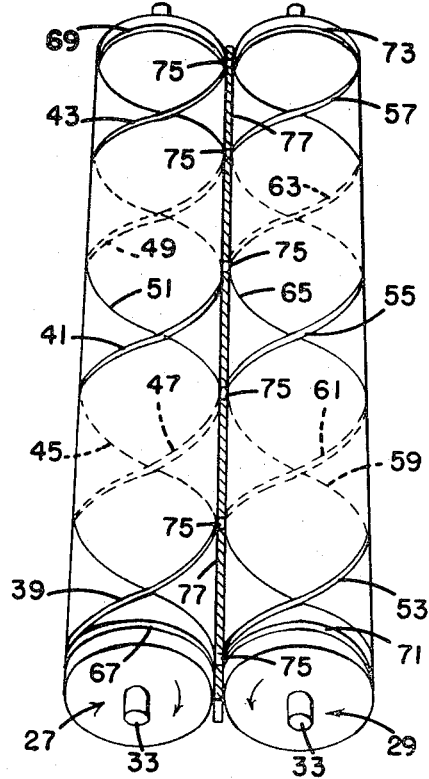
FIG. 2 is a perspective view of a portion of the apparatus shown in FIG. 1.
Figure 3:
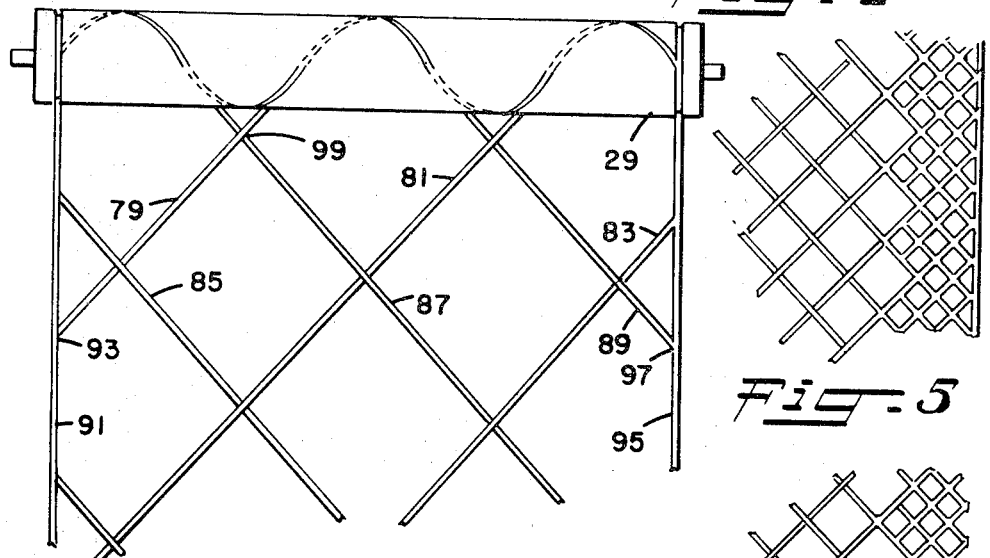
FIG. 3 is a diagrammatic view illustrating the woven pattern of the net-like structure which is produced by the apparatus shown in FIG. 1.

As shown in FIGS. 2 and 3, the roller 27 is formed with grooves 39, 41 and 43 extending along one helix, as indicated by line 45, and grooves 47 and 49 extending along another helix, as indicated by line 51, which is of opposite hand and thus intersects with the helix 45. The helices 45 and 51 are of like pitch and the grooves are oriented so that the grooves extending along one helix, such as the grooves 39, 41 and 43, pass midway between the ends of the grooves formed along the intersecting helix, such as grooves 47 and 49. All of the grooves in the roller 27 are of the same length and are equal in length to the ungrooved portion of the roller surface extending between the ends of adjacent grooves of the same hand. More specifically, in the construction illustrated, the ends of each groove and the ends of adjacent grooves along either helix are spaced the same distance, as measured along the length of the roller 27; namely, one-half of the helix pitch. The grooves 39, 41, 43, 47 and 49 are of like width and are of substantially the same width throughout their depth.

The roller 29 is of the same construction as the roller 27, having grooves 53, 55 and 57, which correspond to grooves 39, 41 and 43 of the roller 27, extending along a helix denoted by line 59 and grooves 61 and 63, corresponding to grooves 47 and 49 of the roller 27, extending along a helix as indicated by line 65.

In addition to the helical grooves described above, annular grooves 67 and 69 are provided in the roller 27 and are aligned with similar annular grooves 71 and 73 formed in the roller 29. As shown in FIG. 2, the ends of the outermost helical grooves of each roller, such as the grooves 39 and 43 of the roller 27, merge with or connect with the annular grooves which are adjacent thereto.

As shown in FIGS. 1 and 2, the free edge of the plate is slotted at 75 to provide partitions 77. The free ends of the partitions 77 terminate below a plane passing through the centers of the rollers 27 and 29, and the space between the rollers 27 and 29 which is occupied by the slots 75 and partitions 77 is closed by a portion of the separator plate so that the only material which is extruded is that which passes through the roller grooves. The slots 75 in the separator plate are substantially equal in width to the grooves in the rollers 27 and 29 and have a center-to-center spacing equal to the length of a roller groove or, in the construction illustrated, equal to one-half, of the pitch of the helices along which the grooves extend.

In the described apparatus, the rollers 27 and 29 are oriented as shown in FIG. 2 so that the leading ends of grooves formed along the corresponding helices of the two rollers, such as the grooves 39, 41 and 43 of the roller 27 and grooves 53, 55 and 57 of the roller 29, will be simultaneously aligned with slots 75 in the separator plate during rotation of the rollers.

With the parts of the apparatus in positions as shown in FIGS. 1 and 2, the rollers 27 and 29 are together rotated continuously and at the same rate of speed in the direction of arrows 35 and 37, respectively, by suitable means, not shown. Molten thermoplastic material is delivered into the chamber 17, passes through the slot 19 and is received in certain of the roller helical grooves as well as the annular grooves 67, 69, 71 and 73. For example and more particularly, molten thermoplastic material received in the grooves 39, 41 and 43 of the roller 27 is carried away from the slot 19 as such roller is turned in the direction of arrow 35 and issues from the apparatus as continuous streams, which are indicated at 79, 81 and 83 in FIG. 3. Since these grooves extend helically about the roller 27, the points at which extrusion occurs from the respective roller grooves will move transversely of the direction of extrusion as the roller 27 is turned. More specifically, as viewed in FIG. 2, clockwise rotation of the roller 27 will cause the streams 79, 81 and 83 which are extruded from the roller grooves 39, 41 and 43 to move toward the observer.

Simultaneously, molten thermoplastic material will also be received in the grooves 53, 55 and 57 of the roller 29 and, as this roller is turned in the direction of arrow 37, will issue therefrom as continuous streams, which are as indicated at 85, 87 and 89 in FIG. 3. The grooves 53, 55 and 57, of the roller 29 also extend along helical paths and thus the points at which the streams 85, 87 and 89 are extruded will move transversely of the direction of extrusion, or away from the observer as viewed in FIG. 2, with counterclockwise rotation of the roller 29.

As the grooves 39, 41 and 43 of the roller 27 and the grooves 53, 55 and 57 of the roller 29 move half way across a common partition 77 and are thus aligned with each other, the streams issuing therefrom will cross, but will not contact each other since the partitions themselves maintain the streams separated from each other. With continued rotation of the rollers 27 and 29, the trailing ends of the grooves 39, 41 and 43 in the roller become aligned and communicate with alternate slots 75 in the separator plate 25. More specifically, the trailing end of the roller grooves 39 will become aligned with the separator plate slot 75 nearest to the observer, as viewed in FIG. 2, through which the annular grooves 67 and 71 of the rollers 27 and 29, respectively, are maintained in continuous communication with each other. A continuous straight or vertical stream of thermoplastic material, indicated at 91 in FIG. 3, is extruded from the aligned annular grooves 67 and 71 of the rollers 27 and 29 and, since the roller groove 39 opens into the annular groove 67, the thermoplastic material issuing therefrom will terminate at and blend into the stream 91 as shown at 93.

At alternate slots 75 in the separator plate 25, the trailing ends of the grooves 41 and 43 of the roller 27 will align and communicate with the leading ends of grooves 61 and 63 of the roller 29. At this time, extrusion of thermoplastic material through the grooves 41 and 43 in the roller 27 ceases and simultaneously commences through the grooves 61 and 63 in the roller 29. Thus, the streams 81 and 83, being first extruded from the left side of the separator plate 25, as viewed in FIG. 2, are now extruded from the right side thereof.

Concomitantly, with the movement of grooves 39, 41 and 43 of the roller 27 into alignment with separator plate slots 75, the grooves 53, 55 and 57 of the roller 29 are also aligned with slots 75 in the separator plate 25. More particularly, the roller groove 57 becomes aligned with the separator plate slot 75 furthest away from the observer, as viewed in FIG. 2, through which the annular grooves 69 and 73 of the rollers 27 and 29 are maintained in continuous communication with each other. A straight or vertical stream of thermoplastic material, indicated at 95 in FIG. 3, is extruded from these aligned annular grooves 69 and 73, and, since the roller groove 57 opens into the annular groove 73, the thermoplastic material issuing therefrom will terminate at and blend with the stream 95, as indicated at 97.

At the same time, the trailing ends of the grooves 53 and 55 will become aligned with slots 75 in the separator plate 25, which alternate with the slots 75 aligned with the grooves 41 and 43 of the roller 27, and will communicate with the leading ends of grooves 47 and 49 in the roller 27. In this position, extrusion of thermoplastic material from the grooves 53 and 55 stops and simultaneously starts to issue from the grooves 47 and 49. Thus, the streams 85 and 87, being first extruded from the right side of the separator plate are now extruded from the left side thereof.

The above-described exchange of reversal of planes of extrusion of the streams provides for interlacing of the streams below the extrusion apparatus, as indicated at 99. The streams of thermoplastic material 81 and 83 now being extruded from the grooves 61 and 63 of the roller 29 and the streams 85 and 87 extruded from the grooves 47 and 49 of the roller 27 are moved relative to the partitions 75 of the separator plate 25 and transversely of the direction of extrusion. Of significance is that the respective streams issue first from grooves of one roller and then from grooves of opposite hand in an opposing roller and thus maintain their original direction of transverse movement relative to the direction of extrusion.

In a manner as heretofore described, the streams of thermoplastic material extruded from the grooves 47 and 49 of the roller 27 and the grooves 61 and 63 of the roller 29 cross each other without contacting as the opposing grooves pass each other during their travel half way across common partitions of the separator plate. As such grooves again align themselves with slots 75 in the separator plate, the streams again exchange or reverse planes of extrusion, as heretofore described. The streams of molten thermoplastic material, which are extruded may be quenched, as by cool air, to provide a desired fabric or net-like structure of interwoven strands.

Figure 5:
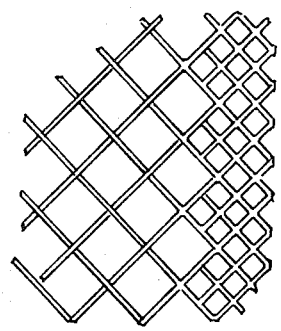
FIG. 5 is a view similar to FIG. 4 showing a portion of a woven net-like structure having a still further modified edge section.
Figure 4:
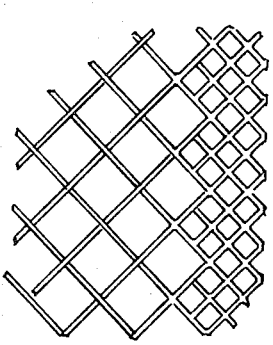
FIG. 4 is a diagrammatic view illustrating a portion of a woven net-like structure having a modified edge section.

If desired, the above-described apparatus may be modified to provide the end portions of both rollers with grooves along all of the intersecting helices. The annular roller grooves 67, 69, 71 and 73 may be retained, in which case the grooves at the end portions of the rollers would terminate therein, or such annular grooves may be eliminated. Streams would be extruded on opposite sides of the separator plate as the rollers are turned. These streams would contact each other at the separator plate slots to form integral junctions. The resulting web would have edge portions as illustrated in either FIG. 4 or 5, the latter being formed by rollers having no annular grooves.

Referring now to the embodiment of the invention shown in FIGS. 6–9, the apparatus there illustrated includes an elongated extrusion block 105 having a chamber 107 into which molten thermoplastic material may be delivered, as by a conventional screw extruded not shown. A pair of guides 109 and 111 are fixed by bolts 113 to the extrusion block 105 and are each formed with a rib or rail 115 which together support flat movable members 117 and 119 for sliding movement. More particularly, the ribs or rails 115 of the guides 109 and 111 are received in grooves 121 formed in the movable members 117 and 119 so that the latter are adapted to be moved transversely of the direction of extrusion as well as in directions toward and away from each other.

Both the pair of guides 109 and 111 and the movable members 117 and 119 are formed with opposing converging surfaces, as indicated at 123 and 125, which extend the length thereof and altogether provide a cavity 127 which receives the molten thermoplastic material from the chamber 107. A set of like spaced grooves or openings are formed in the opposing surfaces of the movable members 117 and 119. For the sake of simplicity and ease of description, the grooves in the movable members 117 and 119 have been designated in FIG. 9 by capital and lower case letters respectively. Means, not shown, are provided for reciprocating the movable members 117 and 119 so that the sets of spaced grooves in such members are periodically aligned with each other.

Positioned within and extending the length of the cavity 127 is a rigid bar 129 which is fixed by pins 131. A separator plate 133 is supported by and extends from the bar 129 and projects in between the movable members 117 and 119. The opposing surfaces 135 of the movable members are maintained in snug but slidable contact with the sides of the plate 133, as by adjusting screws 137 which extend through the guides 109 and 111 and abut against the die-carrying members.

Figure 6:
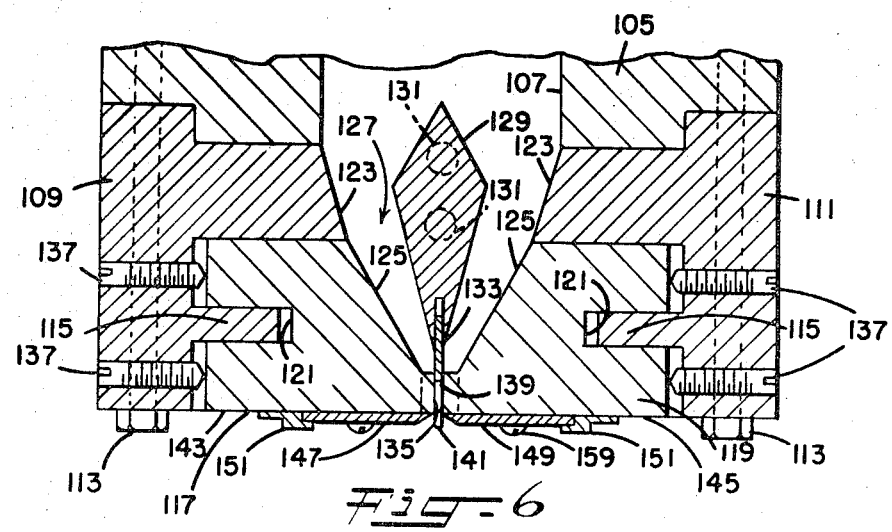
FIG. 6 is a vertical section taken transversely of a second embodiment of the apparatus of the present invention.
Figure 7:
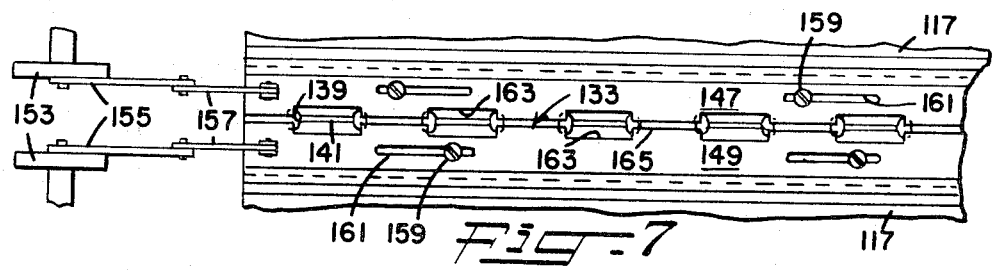
FIG. 7 is a bottom view of a portion of the apparatus shown in FIG. 6.

As shown in FIGS. 6 and 7, the free edge of the plate 133 is slotted at 139 to provide partitions 141 which preferably extend beyond the outermost surfaces 143 and 145 of the movable members 117 and 119. The slots 139 in the plate 133 are of the same width and spacing as the grooves formed in the opposing surfaces of the movable members 117 and 119 and open into the cavity 127. The partitions 141 serve to prevent the grooves in the movable members 117 and 119 from communicating with each other in certain of their aligned positions. As heretofore mentioned, the plate 133 is preferably made as thin as permitted by strength requirements.

A pair of shutters 147 and 149 are supported by guides 151 for slidable movement along opposite sides of the plate 133 and relative to the movable members 117 and 119. A pair of cranks 153, each acting through links 155 and 157, serve to reciprocate the shutters 147 and 149 in opposite directions at selected time intervals. Screws 159 fixed to the movable members 117 and 119, and extending through slots 161 in the shutters, prevent opposing edges of such shutters from moving away from the members 117 and 119 under extrusion pressures.

Recesses 163 occur along the opposing edges of the shutters 147 and 149. The recesses 163 and the unrecessed portions 165 therebetween are all of the same length which is equal to the center-to-center spacing of the grooves formed along opposing surfaces of the members 117 and 119. The depths of each of the shutter recesses 163 are at least equal to the depth of the grooves in the movable members.

Figure 8:
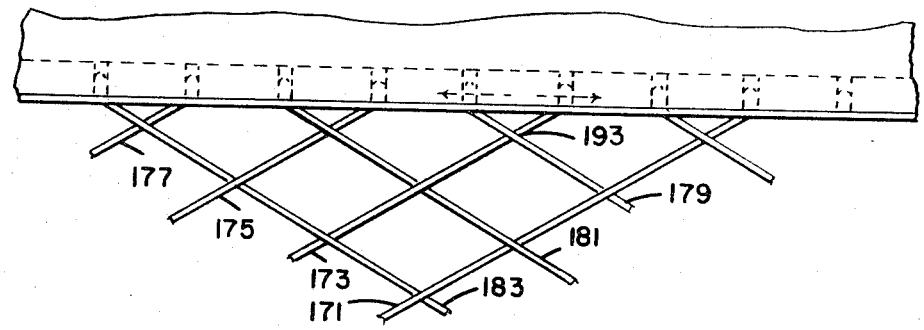
FIG. 8 is a diagrammatic view illustrating the woven pattern of the net-like structure which is produced by the apparatus shown in FIG. 6.
Figure 9:
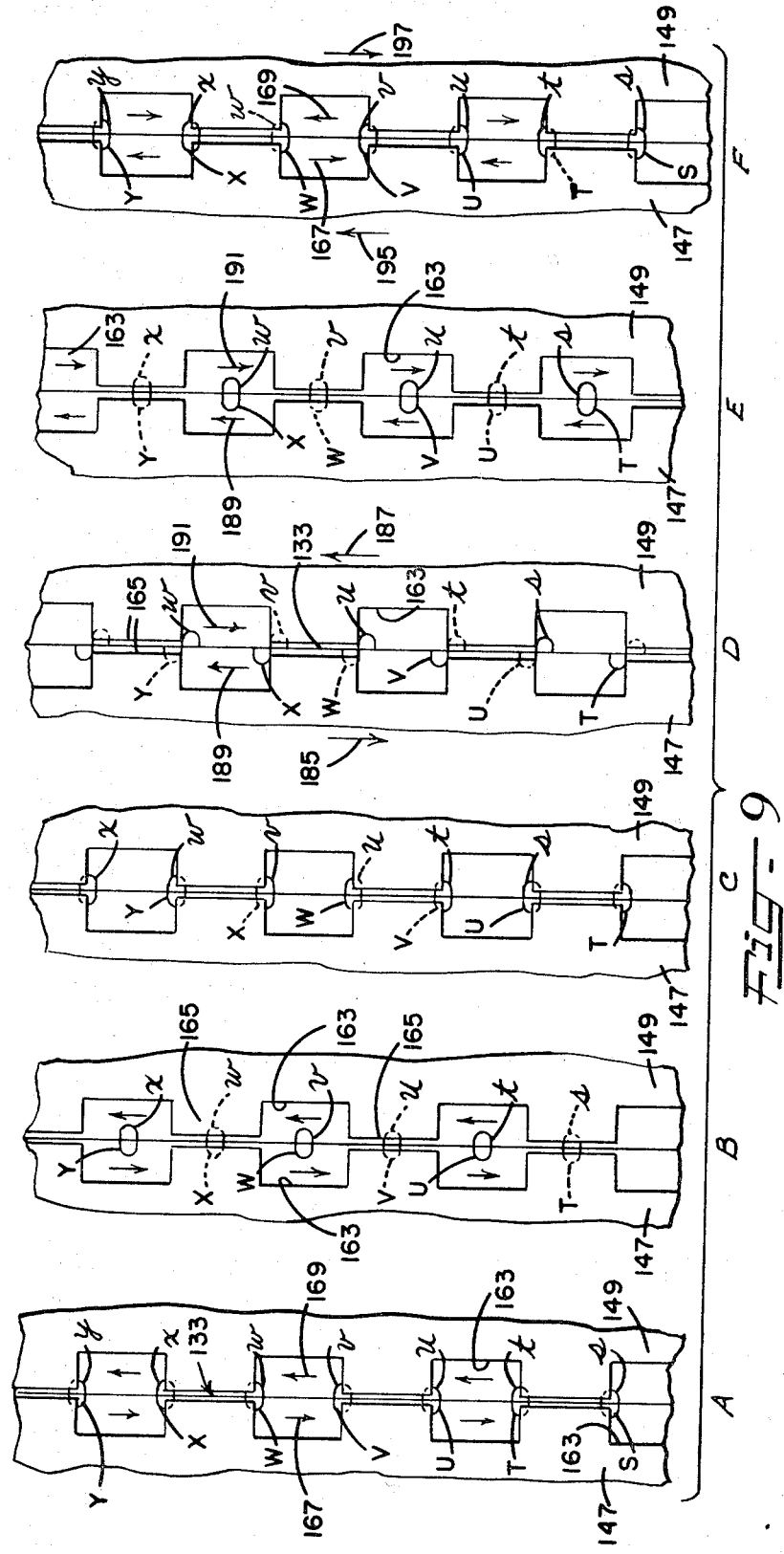
FIG. 9 is a view illustrating the same elements of the apparatus shown in FIGS. 6 and 7, in various positions, designated as A, B, C, D, E and F, assumed during the production of the fabric shown in FIG. 8.

In the operation of the above-described apparatus, molten thermoplastic material is delivered through the chamber 107 and into the cavity 127. With the elements of the apparatus initially positioned as illustrated, for example, in FIG. 9A, the members 117 and 119 are moved at the same rate of speed in opposite directions, as shown by arrows 167 and 169, relative to the fixed separator plate 133 and the shutters 147 and 149. During this movement, grooves S, U, W and Y in the member 117 will travel along recesses 163 in the shutter 147 and molten material will issue therefrom as streams 171, 173, 175 and 177, as shown in FIG. 8. Likewise, grooves t, v and x in the member 119 will travel along recesses 163 in the shutter 149 so that molten material will issue therefrom as streams indicated at 179, 181 and 183 in FIG. 8.

The remaining of the illustrated grooves in the members 117 and 119 will travel relative to and be covered by the unrecessed portions 165 of the shutters 147 and 149 and thus no thermoplastic material will issue therefrom. Midway of their movement along the shutter recesses 163, the grooves U, W and Y in the member 117 and the grooves t, v and x in the member 119 will be in aligned positions, as shown in FIG. 9B. The partitions 141 of the separator plate 133 will, however, be interposed between such grooves so that no contact and bonding of the separately extruded streams occurs.

With continued movement in the direction of arrows 167 and 169, opposing grooves in the members 117 and 119 are aligned with slots 139 in the plate 133 and are thus in communication with each other, as shown in FIG. 9C. Grooves U, W and Y in the member 117 and grooves t, v and x in the member 119 have completed their travel along the shutter recesses 163 and are now partially covered by unrecessed portions 165 of the shutters so that extrusion of molten thermoplastic material therethrough is reduced. Likewise, grooves T, V and X in the member 117 and grooves s, u, w and y in the member 119 have completed their travel along the unrecessed portions of the shutters and extend partially into recesses thereof so that extrusion has started therethrough. Thus, while extrusion of molten thermoplastic material is reduced through certain of the grooves of the members 117 and 119, extrusion is started in grooves which are aligned and in communication therewith so that continuity of the streams is maintained.

At the instant the members move into positions as illustrated in FIG. 9C, the shutters 147 and 149 are shifted in opposite directions as indicated by arrows 185 and 187 in FIG. 9D. It will be noted that the shutters are moved a distance equal to the spacing between grooves in the movable members 117 and 119.

Simultaneously with the shifting of the shutters 147 and 149, the movable members 117 and 119 each reverse their direction of travel as indicated by arrows 189 and 191, with the members 117 and 119 moving in opposite directions to the respective shutters 147 and 149. As a result, grooves U, W and Y in the member 117 and grooves t, v and x in the member 119, through which extrusion of thermoplastic was reduced, are progressively and then completely covered by unrecessed portions 165 of the shutters 147 and 149. Concomitantly, grooves T, V and X in the member 117 and grooves s, u, w and y in the member 119, through which extrusion of thermoplastic material has been initiated, are progressively uncovered until they assume positions completely within recesses 163 of the shutters 147 and 149.

It will be noted that the concomitant shifting of the shutters and reversal in the direction of movement of the members 117 and 119 causes the streams of thermoplastic material to exchange or reverse planes along which they are extruded. Of significance is that while the individual streams of thermoplastic material are extruded from grooves of one movable member and then from grooves of the other of such member, the members themselves reverse their directions of travel as the streams exchange or reverse planes of extrusion and thus the individual streams at all times move in the same direction transversely of the direction of extrusion.

As shown in FIG. 9E, grooves in the members 117 and 119 are in aligned but non-communicating relationship as they travel midway across the shutter recesses, thus causing the streams extruded therefrom to cross below the extrusion apparatus, as indicated at 193. This crossing of the extruded streams of thermoplastic material is similar to that achieved when the elements of the apparatus are in positions illustrated in FIG. 9B, with the exception that the streams, having exchanged planes of extrusion, cross on opposite sides of each other.

With continued movement in the direction of arrows 189 and 191, the members 117 and 119 reach positions as shown in FIG. 9F, whereupon the shutters 147 and 149 are shifted in the direction of arrows 195 and 197 respectively, and the members 117 and 119 themselves reverse their motions and again travel in the direction of arrows 167 and 169. This movement again results in an exchange or reversal of planes along which the streams of thermoplastic material are extruded, in a manner as heretofore described. The extruded streams of thermoplastic material are set, as by cooling, below the extrusion apparatus and it can be seen that by continuously repeating the above sequence of steps the fabric or netlike structure which result consists of strands interlaced with each other into a woven construction.

I claim:

1. Apparatus for making a woven web by extrusion including a pair of opposing elongated, movable members having like openings along faces thereof for extruding a series of spaced streams of stand-forming material along each of two spaced surfaces, means for feeding strand-forming material to said openings for extrusion therefrom; a fixed separator plate positioned between said movable members for maintaining the series of extruded streams separated from each other; means supporting said members in sliding contact with said separator plate, drive means for moving said members to displace the openings therein in opposite directions and transversely to the direction of extrusion, said separator plate having a series of slots formed at spaced intervals thereof whereby openings in said opposing members communicate with each other when together displaced relative to said slots, and means for terminating extrusion of streams of strand-forming material from certain of said openings as they are displaced relative to the separator plate slots and are aligned with communicating openings.

2. Apparatus as defined in claim 1 wherein said movable members are rollers and the openings therein are grooves formed in the periphery of each of said rollers at spaced intervals along intersecting helices of like pitch and wherein said drive means rotate said rollers relative to said separator plate.

3. Apparatus as defined in claim 2 wherein said grooves are all of substantially the same length and are equal to the spacing between adjacent ends of the grooves extending along the individual helices, as measured along the length of said rollers.

4. Apparatus as defined in claim 3 wherein said drive means rotate said rollers in the same direction.

5. Apparatus as defined in claim 4 wherein said drive means rotate said rollers in opposite directions.

6. Apparatus as defined in claim 3 wherein the ends of each of the grooves extending along one helix are spaced a distance equal to ½ of the helix pitch and are displaced 180° relative to the ends of the grooves extending along the intersecting helix.

7. Apparatus as defined in claim 3 wherein the spacing of said slots in said separator plate is substantially equal to the length of said roller grooves.

8. Apparatus as defined in claim 2 wherein said grooves are of substantially the same width and are generally equal to the width of said slots in the separator plate.

9. Apparatus as defined in claim 2 further including annular grooves formed in the periphery of said rollers adjacent to the ends thereof, and wherein certain of the roller grooves extending along intersecting helices open into said annular grooves.

10. Apparatus as defined in claim 2 wherein said means for terminating extrusion of strand-forming material through openings in said movable members are the ungrooved portions of said rollers located between the ends of the grooves extending along each helix.

11. Apparatus as defined in claim 2 wherein the grooves extending along one helix pass midway between the ends of adjacent grooves which extend along the intersecting helix.

12. Apparatus as defined in claim 1 wherein said openings are spaced grooves extending along the opposing surfaces of said movable members and wherein said drive means reciprocates said members in opposite directions relative to each other.

13. Apparatus as defined in claim 12 wherein said separator plate closes the space between said grooves adjacent to the entrance ends thereof.

14. Apparatus as defined in claim 1 wherein said means for terminating extrusion of strand material through openings in said movable members includes shutters, and means for actuating said shutters relative to said movable members.

15. Apparatus as defined in claim 12 wherein said means for terminating extrusion of strand material through grooves in said movable members includes a pair of shutters, means supporting said shutters on opposite sides of said separator plate and in contact with said members through which the exit ends of said grooves extend, said shutters each being recessed at spaced intervals along their opposing edges, and means for moving said shutters relative to said members.

16. Apparatus as defined in claim 15 wherein the grooves in said movable members and the slots in said separator plate, are of like spacing which is substantially equal to the length and spacing of said recesses in said shutters.

17. Apparatus as defined in claim 16 wherein the grooves in said movable members are all of substantially the same depth and the recesses in said shutters each have a depth at least equal to that of said grooves.

18. Apparatus as defined in claim 1 wherein said movable members and separator plate are of annular construction.

References Cited

UNITED STATES PATENTS

| | | | |
|---|---|---|---|
| 2,919,467 | 1/1960 | Mercer | 18—12X |
| 3,019,483 | 2/1962 | Schultheiss | 18—12X |
| 3,163,691 | 12/1964 | Anderson et al. | 18—12X |
| 3,228,063 | 1/1966 | Gutierrez | 18—12 |
| 3,394,431 | 7/1968 | Nalle | 18—12 |

J. SPENCER OVERHOLSER, Primary Examiner

M. O. SUTTON, Assistant Examiner

U.S. Cl. X.R.

18—13